(12) United States Patent
Yu

(10) Patent No.: US 7,346,661 B2
(45) Date of Patent: Mar. 18, 2008

(54) REMOTE CONTROL SYSTEM BASED ON THE INTERNET AND A METHOD THEREOF

(76) Inventor: Byong-Zoo Yu, 1228 Tiffany Ct., Inidan Creek, IL (US) 60061

( * ) Notice: Subject to any disclaimer, the term of this patent is extended or adjusted under 35 U.S.C. 154(b) by 863 days.

(21) Appl. No.: 10/398,818

(22) PCT Filed: Oct. 8, 2001

(86) PCT No.: PCT/KR01/01678

§ 371 (c)(1),
(2), (4) Date: Apr. 9, 2003

(87) PCT Pub. No.: WO02/31695

PCT Pub. Date: Apr. 18, 2002

(65) Prior Publication Data

US 2004/0049550 A1 Mar. 11, 2004

(30) Foreign Application Priority Data

Oct. 9, 2000 (KR) .............................. 2000-59295

(51) Int. Cl.
*G06F 15/16* (2006.01)
(52) U.S. Cl. ..................... 709/206; 702/188; 348/143; 379/93.01
(58) Field of Classification Search ................ 709/206, 709/205, 219, 224; 358/1.15; 379/88, 93; 702/188; 348/143
See application file for complete search history.

(56) References Cited

U.S. PATENT DOCUMENTS

| | | | | |
|---|---|---|---|---|
| 5,898,761 A | * | 4/1999 | McHale et al. | .......... 379/93.01 |
| 5,966,427 A | | 10/1999 | Shaffer et al. | |
| 5,987,621 A | * | 11/1999 | Duso et al. | ..................... 714/4 |
| 6,032,208 A | | 2/2000 | Nixon et al. | |
| 6,105,063 A | * | 8/2000 | Hayes, Jr. | ................... 709/223 |
| 6,332,193 B1 | * | 12/2001 | Glass et al. | ................ 713/170 |
| 6,389,464 B1 | * | 5/2002 | Krishnamurthy et al. | ... 709/220 |

(Continued)

FOREIGN PATENT DOCUMENTS

EP 1041472 A1 3/1999

(Continued)

OTHER PUBLICATIONS

Automated Recovery in a Secure Bootstrap Process—Arbaugh, Keromytis, Farber. . (1998) ☐☐www.isoc.org/isoc/conferences/ndss/98/arbaugh.pdf.*

(Continued)

*Primary Examiner*—Thong Vu
(74) *Attorney, Agent, or Firm*—The Farrell Law Firm, PC

(57) ABSTRACT

The present invention discloses a remote control system based on the Internet and a method thereof utilizing an IPAC (Internet Protocol Adapter/Converter) module which collects data and forms an interface with the peripheral devices which are executing tasks through the electrical connection of arbitrary analog/digital signals, in accordance with signals are programmed by the users. If this programmed commands and controlled results are recognized by a target device, the IPAC uploads the data to the Internet and controls, transmits and receives the data in sequence in order to store to a NxtView server of the website. The system according to this present invention remotely controls various devices through the Internet and comprises NxtView IPACs installed in each of the various devices, a NxtView server connected to the IPACs through the Internet, the clients connected to the server through the Internet and a means for transmitting the status of each device connected to the server.

9 Claims, 5 Drawing Sheets

U.S. PATENT DOCUMENTS

| | | | |
|---|---|---|---|
| 6,553,336 B1* | 4/2003 | Johnson et al. | 702/188 |
| 6,564,246 B1* | 5/2003 | Varma et al. | 709/205 |
| 6,662,217 B1* | 12/2003 | Godfrey et al. | 709/219 |
| 6,687,656 B2* | 2/2004 | Durbin et al. | 702/188 |
| 6,724,408 B1* | 4/2004 | Chen et al. | 715/853 |
| 6,792,395 B2* | 9/2004 | Roberts | 702/188 |
| 6,801,603 B1* | 10/2004 | Arev et al. | 379/88.17 |
| 6,970,183 B1* | 11/2005 | Monroe | 348/143 |
| 7,032,115 B2* | 4/2006 | Kashani | 713/300 |
| 7,061,636 B2* | 6/2006 | Ryan et al. | 358/1.15 |
| 7,233,948 B1* | 6/2007 | Shamoon et al. | 707/9 |
| 2002/0046122 A1* | 4/2002 | Barber et al. | 705/17 |
| 2002/0078198 A1* | 6/2002 | Buchbinder et al. | 709/224 |
| 2003/0126258 A1* | 7/2003 | Conkright et al. | 709/224 |
| 2006/0064323 A1* | 3/2006 | Alleckson et al. | 705/2 |
| 2006/0064340 A1* | 3/2006 | Cook | 705/10 |
| 2006/0154642 A1* | 7/2006 | Scannell, Jr. | 455/404.1 |

FOREIGN PATENT DOCUMENTS

| | | |
|---|---|---|
| WO | WO 00/48058 | 8/2000 |

OTHER PUBLICATIONS

A Framework for the Integration of Legacy Devices..—Aschemann.. (1999) ☐☐www.ito.tu-darmstadt.de/publs/papers/dsom99.ps.gz.*

* cited by examiner

REMOTE CONTROL SYSTEM BASED ON THE INTERNET AND A METHOD THEREOF

BACKGROUND OF THE INVENTION

1. Field of the Invention

The present invention relates to a remote control system based on the Internet and a method thereof. Especially, the present invention relates to a remote controlling method of a controller through Internet websites and data storage and a system therefor.

2. Description of the Related Arts

The most important merit of the Internet is an intercommunication ability regardless of the operating systems. That is, various electronic items that are adapted to communicate by an Internet telecommunication protocol, e.g. TCP/IP, can communicate mutually despite having operating systems that are different from each other or lacking an operating system. And they can communicate with the reliability independent of costs, time and distance.

In another words, a massive amount of data can be transferred without the need for control by a Central Hub Communication Center. Rather, Distribution Communication Management, which depends upon the state of the network, may select various routes at any given moment.

An IPAC (Internet Protocol Adapter/Converter) transforms the digital or analog data inputted from any devices into data that is transmittable on the Internet and outputs the data if the data's purpose and content are clear.

Now we explain about the IPAC's application to a fuel tank system for vehicles, which is one of the biggest businesses in petroleum industry, as described below.

First, the information on the exact fuel quantity and on the quantity to supply to the general public is necessary to the operator of the fuel tank system.

Second, a continuous inspection of the state of the fuel tank and of an environment contamination is necessary.

To achieve the above purposes, the U.S., European and other countries recommend installation of a tank monitor in gas stations and factories that are certified by the Ministry of Environment of U.S.

The known art, however, fails to disclose a method to easily, exactly and quickly transmit such data, creating inconvenience and waste.

As indicated above, the IPAC can be applied to the fuel tank field as well as to every field having electric signals.

In many cases, as the IPAC should be operated without the need for manual intervention, the IPAC should be set up remotely and the IPAC system should be able to change in accordance with the needs of an other party's system.

A related prior art in this field is an U.S. Pat. No. 5,966,427 "Apparatus and Method for Troubleshooting Internet Protocol Telephony Networks", which was filed in 30 Sep. 1997 and assigned to Siemens Information, Communications Networks, Inc.

This patent relates to a system and a method for finding error by the Internet Protocol Telephone Network (IPTN) and comprises numbers of input/output members to connect the device to one of sites in the IPTN. A system controller connected to one of the connecting members receives/transmits digital control messages and sets up a two-way audio telecommunication link in the IPTN. A system control user interface connected to the system controller makes user order a call to remote telephone. A converter connected to one of the connecting members converts digital audio signals received from the remote telephone to analog digital signals and converts analog audio signals generated from a microphone to digital audio signals to transmit to the remote telephone. The interface makes synchronized data transmission easy by synchronizing with the remote telephone. Another related prior art this technology is an adapter for an analog IP telephone error checking device.

Another prior art related to this field is a device called TLS350 sold by the U.S company Veeder-Root. This device controls and takes data by using a remote modem call or a facsimile machine. But, this device has a limit to a data collecting and reading method. That is, this device requires an investigation of target peripheral devices through direct communication between a main computer and a remote peripheral devices by a remote keyboard operation and telephone or facsimile. But, it becomes to be difficult to finish the polling process within a predetermined time as the number of the monitored peripheral devices increases. This method requires high cost and it is impossible to directly manage the devices monitored from the remote site. A significant shortcoming of such devices of the known art are their a limited application to only specific devices and failure to act as open communication device.

SUMMARY OF THE INVENTION

In the present invention, it is an object to provide a remote control system based on the Internet and a method thereof in order to solve the above problems. That is, the present invention provides a technology to be applied to the exchange and collection of industrialized/commercialized data by using the essential merits of the Internet.

BRIEF DESCRIPTION OF THE DRAWINGS

For a better understanding of the object, other features and advantages of the present invention, reference is made to the following detailed description to be read in conjunction with the accompanying drawings, in which.

DETAILED DESCRIPTION OF THE PREFFERED EMBODIMENTS

Figure 1:
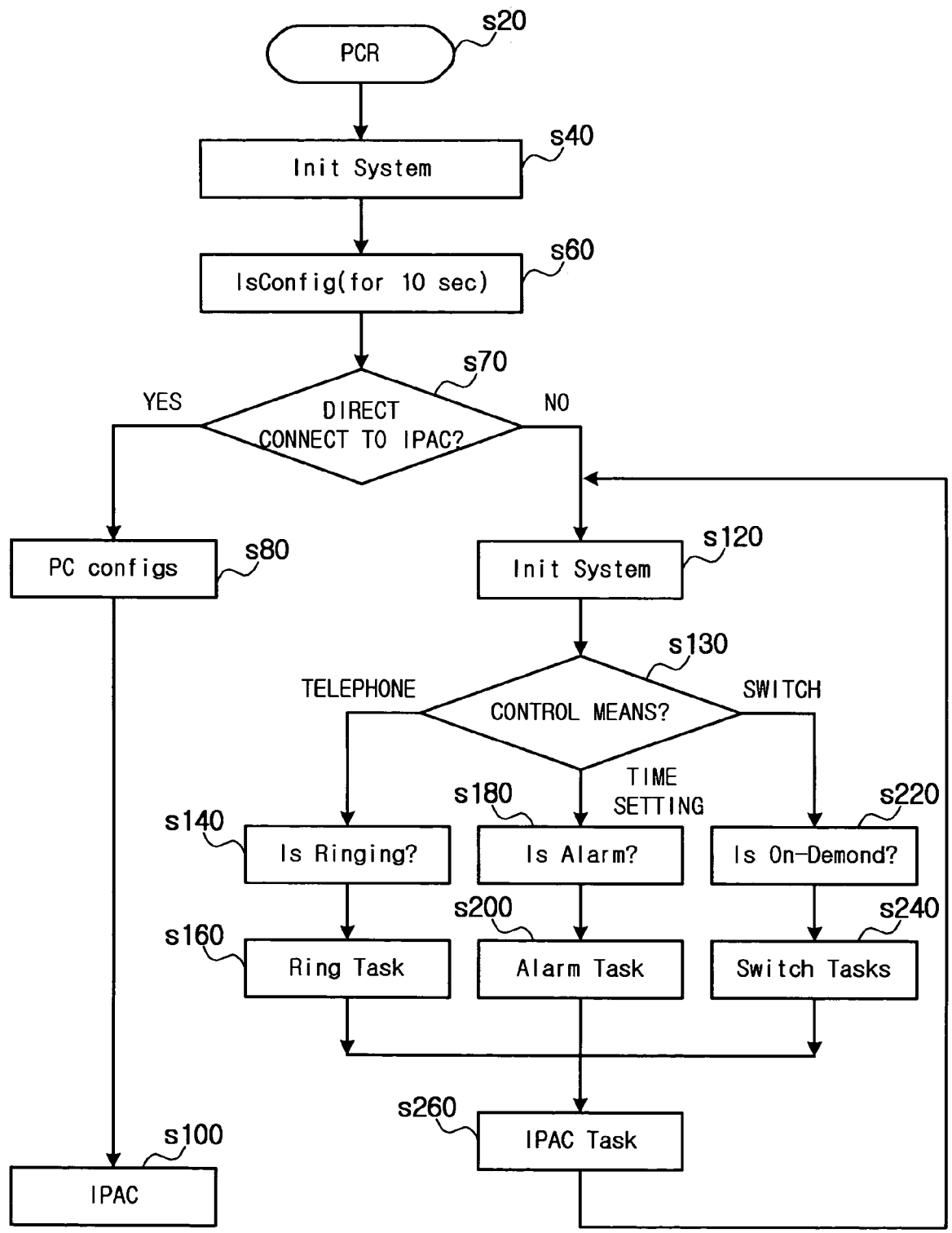
FIG. 1 is a flowchart illustrating a remote control method based on the Internet according to the present invention.

The present invention provides an IPAC and a NxtView server in order to solve the above problems.

Generally, distinctive features of data handled in the IPAC are as follows:

First, there is data for communication between the IPAC and the NxtView server or computers. The data is a program including a protocol and contents interpretable only by the IPAC or a computer and a server which are connected to the IPAC.

Second, there is a data for communication with a third system connected to the IPAC. The data included in the IPAC or the NxtView server is a program that is capable to communicate with any system, if the system exchanges data with the IPAC.

An important thing is that the above second data processing is possible by setting up the IPAC because of the ability of the IPAC.

Another important thing in practical operation is to ensure that the data is collected. And even in case of interruption of communication line, the system's reliability increases if the unsent data was sent repeatedly to the NxtView server and the server analyzes the sent data.

This device, called Internet Protocol Adapter/Converter (IPAC) controls peripheral devices and exchanges data with the peripheral devices to get information. The peripheral devices include a device for monitoring the quality of a fuel storage system, a temperature, a pressure and the circumstances of the predetermined remote site.

The operational records of a website communicating with this device as well as a security means for storing data are supplied.

There is no knowledge based space in a control/collect means, IPAC because a central logic space called website server is supplied to the IPAC.

Users can easily access to the peripheral devices that is usable to multi-users simultaneously without any restriction of place and time by using a web server and a sub-IPAC.

The remote control system according to the present invention provides an open platform. For example, a system configuration to adapt to any devices connected to the control system is free to the users. Furthermore, the operation is possible not only at the installed place but also at the remote site.

The IPAC performs the given tasks utilizing the commands generated from the web server at regular time intervals. If the user's request is changed, the time interval can be changed. And the IPAC does not need to set up hardware accessible by the users. Therefore the IPAC reduces the errors and can be set up rapidly with any problems.

The users can program the IPAC either by using a hardwired connection from a computer to the IPAC, or through the Website server. The most critical key of the features is a function built-in IPAC and a corresponding function built-in our web server. This software logic allows us to change operational configurations as well as the user required command sets as often as necessary. Because of this key technology, we are able to review the target data in real-time without reconfiguration or changing commands to the peripherals.

Third, the IPAC/NxtView server is a completely open system. This means that the users know the purpose of registers and their usage. Combining these various registers and freedom of the commands the users can build a powerful data acquisition system to suit their individual needs.

Fourth, due to the programmability of the IPAC, coupled with the push-pull relationship with the NetView Website server, the date acquisition module is relived of the duty to perform the advanced logic and decision-making. Instead, the central server performs these knowledge-based custom functions where the data are archived.

FIG. 1 is a flow chart illustrating a remote control method based on the Internet according to the present invention.

The users can program the NxtView IPAC (hereinafter, simply called an 'IPAC') the IPAC according to the present invention using a wired connection from a PC to the IPAC at any site. An important feature of the IPAC is to program the IPAC remotely. Whenever accessing to the NxtView server, the configuration file is downloaded to the IPAC from the server. In reverse, the owner of an IPAC can log onto the NxtView server at any time in order to configure operational parameters of the IPAC. This advanced setting is downloaded into the IPAC to store data into a non-volatile memory of the IPAC and controls its operation until another update is made.

In the present invention, the IPAC is designed to operate remotely without any manual monitoring. More specifically, the IPAC provides the users with the commands, with which the users can program freely in any format in order to make the system usable to most control/data acquisition applications.

At first, if the power is turned on (s20) a system is initialized (s40), the system is configured for 10 seconds (s60) and checks whether a user's PC is directly wired-connected to the IPAC (s70). If it is directly connected, the PC is reconfigured (s80) and requests the IPAC to transmit data by controlling the IPAC (s10).

If the PC and the IPAC are connected not directly but via the Internet, the IPAC is initialized at the same time of the connection (s120). The reason of the initialization is to clear the preset state in order to acquire correct data.

After the initialization, the means for controlling the IPAC is determined (s130). If it is desired to send control command to the IPAC by telephone (s140), a user sends a call signal to the IPAC (s160). Then the IPAC confirms the receipt of the call signal and starts its operation (s260).

If it is desired to operate the IPAC automatically at a predetermined time by the user (s180), the IPAC checks if it is the predetermined time (s200) and starts its operation at the time (s260).

If it is desired for a user to operate the IPAC manually with a switch because the user is located nearby the IPAC (s220), the user changes over the switch to the active state (s240). Then the IPAC starts its operation (260).

Figure 2:
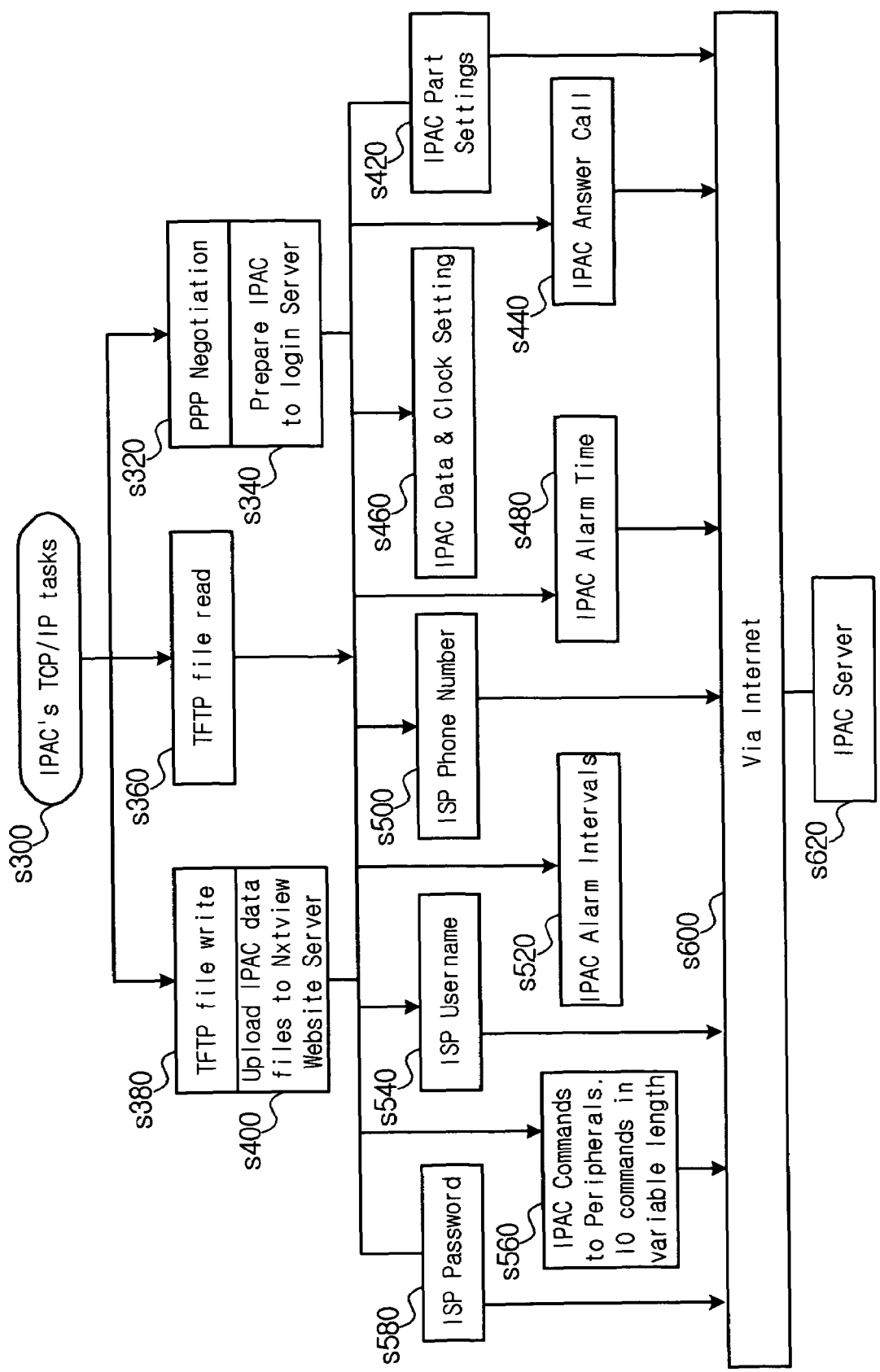
FIG. 2 is a flow chart illustrating transmission of data to a NxtView server through the Internet by an individual IPAC according to the present invention.

FIG. 2 is a flow chart illustrating transmission of an individual IPAC data to the NxtView server through the Internet. The IPAC executes the TCP/IP (s300) and prepares the IPAC to log in the NxtView server (s340) through a PPP navigator (s320). Reading (s360) and writing (s380) files are made by using Trivial File Transfer Protocol (TFTP). The writing files with the TFTP means the upload of the IPAC data files to the NxtView server (s400).

In the above step (s360), the information on the IPAC part settings (s420), the IPAC answer call (s440), the information on the IPAC data & clock setting (s460), the IPAC alarm time (s480), the ISP phone number (s500), the IPAC alarm intervals (s520), the ISP username (s540), 10 IPAC commands to peripherals which are variable in length (s560) and the ISP password (s580) are read. The read data are transmitted to the IPAC server through the Internet (s620).

At this time, the IPAC command is not an inherent command of the IPAC but a command used in the customer's instrument. That is, by setting up the IPAC to analyze and control predetermined electrical signals and commands, the IPAC controls the relevant instrument instead of the customer operator. Therefore, the automatic (unmanned) and remote operation is possible. That is, the commands may be changed in accordance with the inherent contents and commands of the instrument interfaced with the IPAC.

Figure 3:
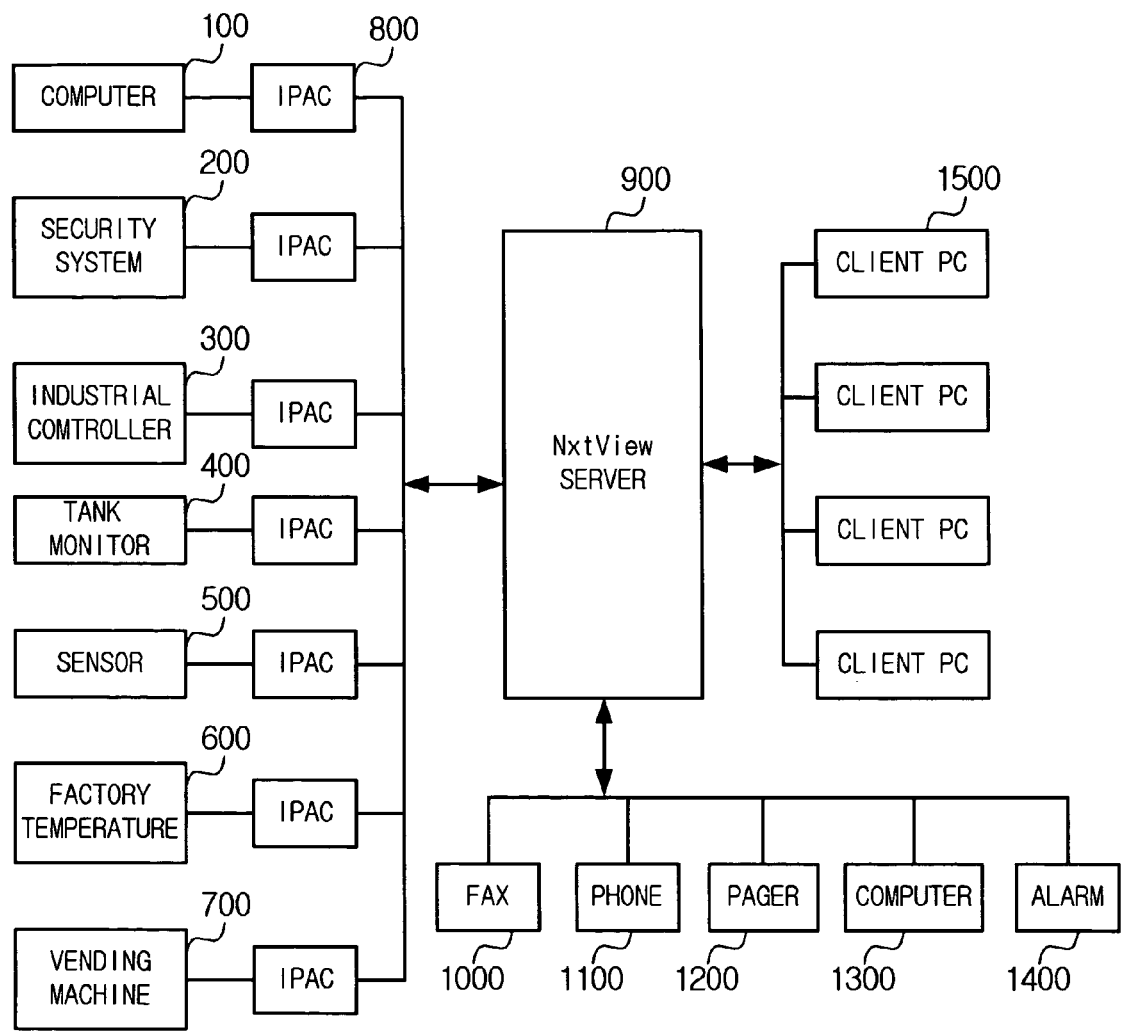
FIG. 3 is a flowchart illustrating a remote control system based on the Internet according to the present invention.
Figure 4A:
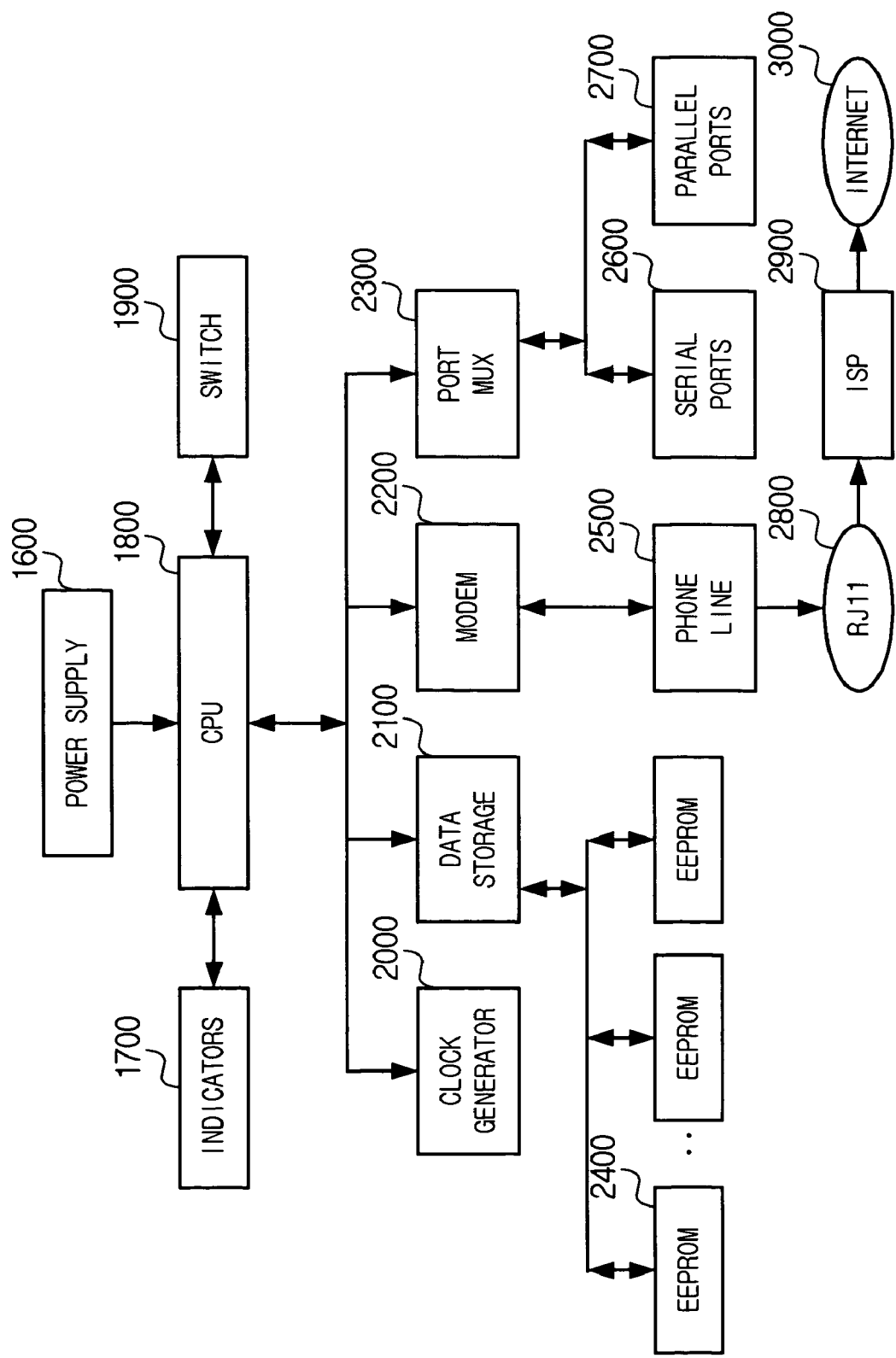
FIGS. 4A and 4B are flowcharts which provide further details of the flowchart of FIG. 3.
Figure 4B:
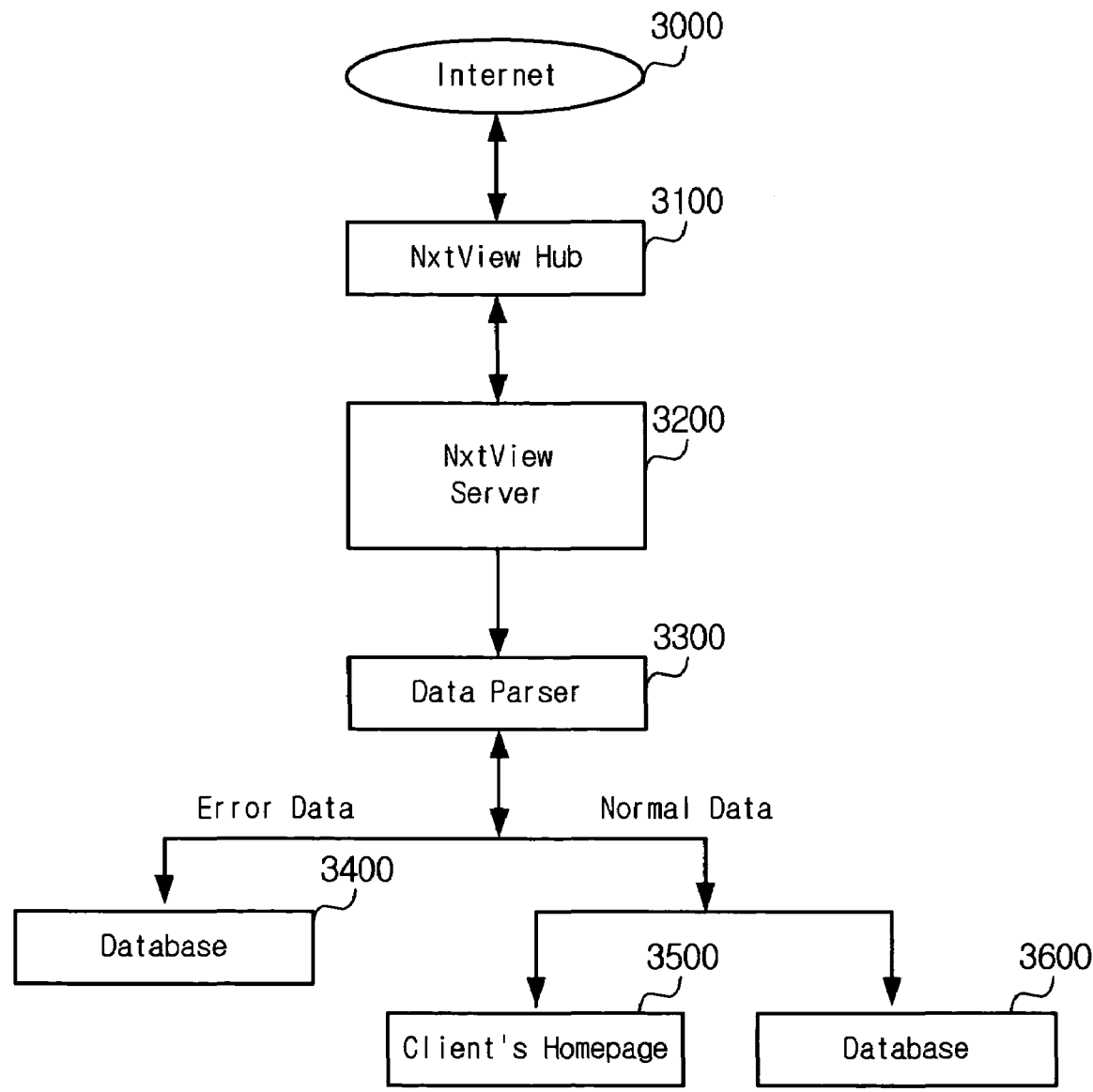

FIG. 3 illustrates a remote control system based on the Internet according to the present invention. FIGS. 4A and 4B are flowcharts which provide further details in regard to the flowchart of FIG. 3.

A plurality of IPACs (800) connected to the NxtView server (900) communicate with the NxtView server. The plurality of IPACs (800) connect to a computer (100), a security system (200), an industrial controller (300), a tank monitor (400), a sensor (500), a factory temperature sensor (600) and a vending machine sensor (700). And the NxtView server is connected to a facsimile machine (1000), a telephone (1100), a pager (1200), a computer (1300), an alarm (1400) and a plurality of clients computers (1500). That is, a number of IPACs (800) are connected to the NxtView server (900) through the Internet and transmit collected data. Then, the NxtView server (900) analyzes the data and transmits the result, etc., to the clients through the facsimile machine, telephone, pager, computer and alarm. The clients (1500) can read their own system's information and control the system remotely by accessing to the NxtView server (900) via the Internet when necessary.

More detailed explanation of the IPAC's operation with the reference of the FIGS. 4A and 4B is as follows.

At first, power is supplied to a CPU (1800) from a power supply (1600). The CPU (1800) controls a switch (1900) and an indicator (1700). A two stage switch (1900) maybe configured and to receive three independent commands.

The CPU (1800) receives clock signals and calendar signals from a clock signal generator (2000). The CPU (1800) is also connected to a data storage means (2100), a modem (2200) and a port multiplexer (2300).

The data storage means (2100) is connected to plurality of EEPROMs (2400) that are located at subordinate positions. The maximum capacity of the data storage means, which is usually a non-volatile memory, in the IPAC is 8,000 bytes preferably.

The modem (2200) is connected to an RJ11 (2800) through the telephone wire and the RJ11 (2800) is connected to the Internet (3000) through an ISP (Internet Service Provider) (2900).

The port multiplexer (2300) comprises a plurality of serial ports (2600) and parallel ports (2700). It is preferable that port multiplexer has 3 serial ports and 2 parallel ports and the number of the ports is changeable in accordance with the user's request. Especially, each parallel port is opto-isolated and an input corresponds to an output.

The operation of the IPAC will now be explained.

If power is applied to the IPAC, then the IPAC checks whether modem (2200) is connected to or not. And then, it orders the set-up for communication and confirms its operation.

After this, the clock signals and calendar signals are inputted into the IPAC from clock signal generator (2000) and these signals because basic information for alarm and time related operations.

The IPAC tests a signal indicator (1700) and informs the operator the information on whether the IPAC's operation started or not by sending visual signals.

The switch (1900) has active position and passive position. If the switch is positioned at active, a CONFIG IPAC routine, which is a specific function of the IPAC, is executed. During this routine, The IPAC resets the EEPROM (2400), sets up all the related parameters to be handled by the IPAC and receives what the operator wants by communicating with the external PC. The setting information made at this time is still stored in the EEPROM even though the power is off.

The connection between the IPAC and PC will now be explained.

In the setting up all the related parameters to be handled by the IPAC, a COM port and the contents related to the telephone are prepared in accordance with the PC's program as follows.

At first, the serial communication parameters of the COM port in the peripheral are prepared. These parameters include a baud rate and parity etc.

A customer's name related to the ISP (telephone service company), a password and a telephone number are programmed in order to communicate automatically via a modem.

The data storing means is cleared to store new data. And the commands of the devices to be connected through the COM port (e.g. a tank monitor) are programmed. This function can be ordered by a web site's server and can be programmed by a PC.

If all the conditions are satisfied, an LED is lighted in accordance with the communication between the IPAC and a PC, and the operator stops the operation. The configuration of the IPAC ends by turning on the power again after turning off it to stop the operation and then the IPAC operates normally.

The telephoning operation will now be explained.

One of the functions designed suitable to the IPAC is a remote control operation and the operation is executed as follows.

For example, when the head office in Seoul city wants to confirm the contents and to receive a report from a device installed in Daegu city, it is not true that the user should let a person operate it manually or the user may know them only at the predetermined time. An operator in Seoul transmits a signal to the IPAC installed in Daegu city by through telephone line connected to the IPAC (this is an essential condition in case of using the modem). If so, the IPAC senses this signal and detects the data asked by the operator in Seoul city and records this detected data on the NxtView server through the Internet. By this, the operator can control the IPAC remotely on the Internet in Seoul city and can acquire desired operation data.

The detection of the telephone signal doesn't cost regardless of long-distance call or international call because the IPAC responses the telephone signal treats automatically if the user transfers a telephone signal and hangs up.

At the same time, the approval disapproval function, as one of the queries on the CONFIG IPAC in a PC, can be added or not in accordance with the customer's choice. For example, this function should not be approved if the telephone line is being used commonly with other purpose (for example, in order to prevent from data sending of the IPAC whenever calling to the opponent by using the general telephone). Its regulation completely depends on the operator. Once the IPAC receives call signal, normal operation is executed and provides data through the Internet.

The alarm operation will now be explained. For example, in case the IPAC is installed in an instrument for testing environment contamination, the IPAC communicates with the instrument at a predetermined wake-up time and sends the test result to a computer if the test result is stored in a database of the computer at the predetermined time three times a day.

In case the IPAC is installed on a tank monitor, the water quantity, the fact whether the water leaks or not, and the fact whether the water was stolen or not, etc. are detected and the detected data is reported to the central station (for example, the web station of the NxtView).

The switching operation will now be explained. The switching operation is similar to the telephoning operation. That is, if the operator goes to the IPAC and turns on the switch when necessary (that is, change over the switch to the active position) and then the IPAC operates and reports the result to the web site of the NxtView through the Internet.

On the other hand, making reference to FIG. 4B, the NxtView server (3200) is connected to the Internet (3000) through a NxtView Hub (3100), and the NxtView Hub (3100) exchanges the IPAC data with the NxtView server (3200). The NxtView server (3200) may use a WIN2000 or an Apache as an operating system.

The NxtView server (3200) analyzes the data inputted from a data parser (3300). As a result of the analyzing, if the data is an error data, the error data is classified into an error data and stored in a database (3400) for diagnosis. If the analyzed data is normal data, the data is stored in a database (3600) and simultaneously transmitted to the client's homepage (3500).

The NxtView server (3200) collects all the data inputted from the devices (100-700, FIG. 3) including a tank monitor (400) through the IPAC, stores and simultaneously distributes the data to the clients (1500) who want to know the contents through the Internet. For this, the NxtView server (3200) has the IPAC function and a browsing function.

The most important feature of the present invention is an operating method of the IPAC, a connection method between the IPAC and the server and a data exchanging method. But, the functions storing the data into a database and for browsing it to the clients when necessary are shown in other prior web sites.

Once the control of the IPAC starts by the telephone or the switch or the time is set-up, the IPAC downloads the configuration file of each client in the NxtView server.

Operational parameters desired by each client are stored in the downloaded configuration files and can be programmed in the web sites.

The function is similar to the configuration of the IPAC through the PC. When the IPAC downloads this file, and then for itself modifies the commands, the time set-up, the telephone number, the password and the customer's name etc. in accordance with the downloaded contents and stores all the operational modes.

A command communicates with a device installed the IPAC and is an instruction needed to extract the data. A tank monitor as an example, a device of the Veeder Root Company needs an 'I20100' command to transmit inventory data. Therefore if the IPAC transmits the 'I20100' command to a monitor of the Veeder Root, and then the device of the Veeder Root Company transmits the inventory data to the IPAC. Then the IPAC stores the inventory data in the EEPROM and transmits it to the server through the Internet later.

The present invention stores these commands in the IPAC regardless of its number (usually, 10), sends a signal to the IPAC through the telephone etc. in order to make the IPAC transmit automatically the data to the server.

The benefits due to the present invention include reducing costs and providing superior communication performance in comparison with the existing system executing similar operations. Especially, it is possible to remotely monitor and control the system easily through the Internet. A further and important merit is the present invention performs the operations in an unmanned manner.

The remote control system according to the present invention provides an open platform. That is, the customer can configure freely a system applicable to any devices connected to the system. Furthermore, the system can be configured at any place installed the devices and at any remote place.

The IPAC executes the operations in accordance with the commands that are given from a web server at a constant time interval. If the customer's demand is changed, the time interval may be changed. And the IPAC doesn't need the setting hardware accessible by a user. Therefore the IPAC can be installed with less reduced errors, faster speed and less problems.

According to the present invention, the remote controlling of the devices is possible because a customer configures the IPAC through a PC, the Internet and a server, and the automation is possible because the operation of the IPAC can be simply ordered by a telephone calling. That is, the setting for the IPAC configuration can be made through the server.

Although the preferred embodiments of the present invention have been described and illustrated in detail, it will be evident to that skilled person in the art that various modifications and changes may be made thereto without departing from the spirit and the scope of the invention as set forth in the appended claims and equivalents thereof.

What is claimed is:

1. An Internet based remote control system for remote control of a plurality of devices, the system comprising:
    a NxtView Internet Protocol Adapter/Converter (hereinafter called an 'IPAC') installed in each of the devices, wherein the IPAC includes a CPU for controlling the IPAC,
    a power supply for supplying power to the CPU,
    a switch for directly controlling the IPAC,
    a clock signal generator for generating a clock signal and a calendar signal and transmitting the clock signal and the calendar signal to the CPU, and
    a port multiplexer having a plurality of serial ports and a plurality of parallel ports for data transmission;
    a NxtView server (hereinafter called a 'server') connected to the IPAC through the Internet, wherein the IPAC includes a modem for communicating with the server, wherein the server classifies data inputted through a data parser and the IPAC into error data and normal data, stores the error data and normal data in different databases, and transmits the normal data to a client homepage;
    a plurality of clients connected to the server through the Internet, wherein the IPAC includes a storing means for storing the data inputted from the plurality of clients to the IPAC; and
    a plurality of means for transmitting the status of the plurality of devices,
    wherein said plurality of devices includes one of a security system, an industrial controller, a tank monitor, a sensor, a factory temperature sensor, and a vending machine sensor.

2. The Internet based remote control system as set forth in claim 1, wherein said plurality of devices further includes another different device selected from one of a computer, a security system, an industrial controller, a tank monitor, a sensor, a factory temperature sensor and a vending machine sensor.

3. The Internet based remote control system as set forth in claim 1, wherein said plurality of transmitting means includes a facsimile machine, a telephone, a pager, a computer and an alarm machine.

4. The Internet based remote control system as set forth in claim 1, wherein said data storing means is a non-volatile memory.

5. The Internet based remote control system as set forth in claim 1, wherein said modem connects to a telephone line, via an RJ11 port and an Internet Service Provider ("ISP"), in order to connect to the Internet.

6. The Internet based remote control system as set forth in claim 1, wherein said IPAC communicates with said server through a NxtView hub on the Internet.

7. A method for remotely controlling various devices by using a NxtView IPAC (hereinafter called an 'IPAC') and a NxtView server (hereinafter called a 'server') on the Internet, wherein said method comprises:

supplying power to the IPAC;
initializing said power supplied IPAC;
configuring said initialized system for a determined time;
confirming whether said configured IPAC is directly connected to a client;
configuring a client Personal Computer ("PC") if directly connected;
operating the IPAC through said configured client PC;
accessing, by the client, the server and initializing the IPAC via the Internet if not connected directly but connected via the Internet;
determining a means for controlling the IPAC;
manually changing over a switch to an operational mode if said determined means is a switch;
operating the IPAC by said switch change-over;
automatically operating the IPAC at a predetermined time interval if said determined means is an automatic control means in accordance with the time interval;
sending a call signal of an operator to the IPAC via a telephone and immediately receiving by the IPAC said sent call signal if said determined means is said telephone;
transmitting data to the server by the IPAC via the Internet;
classifying the data input through a data parser and the IPAC into error data and normal data by the server;
storing the error data and normal data in different databases by the server; and
transmitting the normal data to a client homepage by the server.

8. The remote control method as set forth in claim 7, wherein said transmitting data to the server step comprises:
executing a Transmission Control Protocol/Internet Protocol ("TCP/IP protocol") by the IPAC;
preparing to log in the server by using a PPP Negotiation through said executed protocol by the IPAC;
uploading IPAC data files to the server by a Trivial File Transfer Protocol ("TFTP protocol");
reading the IPAC data files to the server by the TFTP protocol; and
transmitting said uploaded and read data files to the IPAC server via the Internet.

9. The remote control method as set forth in claim 8, wherein said IPAC data files read through the TFTP protocol include an IPAC Part setting information, an IPAC answering call information, an IPAC data and clock setting information, an IPAC alarm time, an IPAC telephone number, an IPAC setting time interval, an ISP customer name, an ISP password and IPAC peripheral commands.

* * * * *